United States Patent
Bawn

(10) Patent No.: US 12,399,322 B2
(45) Date of Patent: Aug. 26, 2025

(54) OPTICAL FIBRE SPLICING METHOD

(71) Applicant: Microsoft Technology Licensing, LLC, Redmond, WA (US)

(72) Inventor: Simon Bawn, Romsey (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 469 days.

(21) Appl. No.: 17/630,604

(22) PCT Filed: Jul. 29, 2020

(86) PCT No.: PCT/GB2020/051811
§ 371 (c)(1),
(2) Date: Jan. 27, 2022

(87) PCT Pub. No.: WO2021/023969
PCT Pub. Date: Feb. 11, 2021

(65) Prior Publication Data
US 2022/0252788 A1    Aug. 11, 2022

(30) Foreign Application Priority Data
Aug. 5, 2019 (GB) ................................. 1911183

(51) Int. Cl.
*G02B 6/255* (2006.01)
(52) U.S. Cl.
CPC ......... *G02B 6/2555* (2013.01); *G02B 6/2551* (2013.01); *G02B 6/2553* (2013.01)
(58) Field of Classification Search
CPC ................................................ G02B 6/2551
See application file for complete search history.

(56) References Cited

U.S. PATENT DOCUMENTS 4,263,495 A    4/1981 Fujita et al.
9,904,008 B2   2/2018 Fokoua et al.
(Continued)

FOREIGN PATENT DOCUMENTS

CN    102169209 A    8/2011
CN    104246559 A    12/2014
(Continued)

OTHER PUBLICATIONS

Office Action Received for Chinese Application No. 202080054309.2, Mailed on Jan. 8, 2024, 4 pages (English Translation Provided).
(Continued)

*Primary Examiner* — Eric Wong

(57) ABSTRACT

A method of forming a splice to join two optical fibres comprises: providing two optical fibres, at least one of which is a hollow core optical fibre; aligning an end of one of the optical fibres with an end of the other optical fibre such that longitudinal axes of the two optical fibres are substantially along a same line and the ends of the optical fibres are spaced apart; performing a prefusion stage (S1) comprising: applying an electric arc proximate the ends of the optical fibres in order to soften the material of the ends; moving the ends of the optical fibres together to make contact and then exceed the contact by an overlap distance to form a fused portion in which the ends are fused together; and performing at least one pushing stage (S2), each pushing stage comprising: implementing a cooling period during which no electrical arc is applied; at the end of the cooling period, applying an electrical arc to the fused portion to soften the material of the fused ends; and pushing the fused ends of the optical fibres further together.

20 Claims, 6 Drawing Sheets

(56) References Cited

U.S. PATENT DOCUMENTS

| | | | |
|---|---|---|---|
| 2003/0081915 A1 | 5/2003 | Fajardo et al. | |
| 2005/0180703 A1 | 8/2005 | Ruegenberg | |
| 2006/0051034 A1 | 3/2006 | Suzuki et al. | |
| 2006/0067632 A1* | 3/2006 | Broeng | G02B 6/02333 385/96 |
| 2006/0153512 A1 | 7/2006 | Falkenstein et al. | |
| 2008/0037939 A1 | 2/2008 | Xiao et al. | |
| 2011/0097045 A1 | 4/2011 | Benabid | |
| 2016/0266315 A1* | 9/2016 | Miyamori | G02B 6/2551 |
| 2017/0015585 A1* | 1/2017 | Sezerman | B23K 26/60 |

FOREIGN PATENT DOCUMENTS

| | | | | |
|---|---|---|---|---|
| CN | 106443885 A | | 2/2017 | |
| CN | 109782389 A | | 5/2019 | |
| CN | 109983379 A | * | 7/2019 | ......... G02B 6/02019 |
| EP | 2172795 A1 | | 4/2010 | |
| JP | 2002148468 A | | 5/2002 | |
| JP | 2004077890 A | | 3/2004 | |
| WO | 03038496 A1 | | 5/2003 | |
| WO | 2015/185761 | | 12/2015 | |

OTHER PUBLICATIONS

International Search Report and Written Opinion of the International Searching Authority for corresponding International Patent Application No. PCT/GB2020/051811, mailed Oct. 23, 2020.
Limin Xiao et al., "Fusion Splicing Photonic Crystal Fibers and Conventional Single-Mode Fibers: Microhole Collapse Effect", Journal of Lightwave Technology, IEEE, USA, vol. 25, No. 11, Nov. 1, 2007 (Nov. 1, 2007), pp. 3563-3574, XP011198542.
R. Thapa et al., "Arc fusion splicing of hollow-core photonic bandgap fibers for gas-filled fiber cells", Optics Express, vol. 14, No. 21, Oct. 16, 2006 (Oct. 16, 2006), pp. 9576-9583, XP055726417.
Combined Search and Examination Report under Sections 17 and 18(3) issued for corresponding GB Application No. 1911183.0, dated Nov. 7, 2019.
J. Broeng et al., "Analysis of air-guiding photonic bandgap fibers", Optics Letters vol. 25(2), 96-98, 2000.
Francesco Poletti, "Nested antiresonant nodeless hollow core fiber," Opt. Express, vol. 22, 23807-23828, 2014.
J.R. Hayes et al., "Antiresonant hollow core fiber with an octave spanning bandwidth for short haul data communications", Journal of Lightwave Technology vol. 35(3), 437-442, 2017.
P.J. Bennett, et al., "Toward practical holey fiber technology: Fabrication, splicing, modelling, and characterization," Opt. Lett., vol. 24(17), 1203-1205, 1999.
B. Bourliaguet et al., "Microstructured fiber splicing," Opt. Express, vol. 11(25), 3412-3417, 2003.
J. Wooler et al., "Robust low loss splicing of hollow core microstructured photonic bandgap fiber to itself", Proc. Opt. Fiber Commun. Conf., 2013.
J. Wooler et al, "Overcoming the challenges of splicing dissimilar diameter solid-core and hollow-core photonic band gap fibers", Workshop on Speciality Optical Fibers and their Applications, Optical Society of America, 2013.
Communication under Rule 71(3) EPC, Received for European Application No. 20751255.9, mailed on Mar. 4, 2024, 08 pages.
"Office Action and Search Report Issued in Chinese Patent Application No. 202080054309.2", Mailed Date: Oct. 25, 2023, 10 Pages.
Borzycki, et al., "Arc Fusion Splicing of Photonic Crystal Fibres", Published by InTech, Mar. 30, 2012, pp. 175-200.
Chong, et al., "Development of a System for Laser Splicing Photonic Crystal Fiber", In Journal of Optics Express, vol. 11, Issue 12, Jun. 16, 2003, pp. 1365-1370.
Xiaoqian, Li, "Fusion Splice Technique of Hollow-Core Photonic Crystal Fibers", In Masteral Dissertation of Beijing University of Technology, Jun. 2, 2018, 69 Pages.
Notice of Grant Received for Chinese Application No. 202080054309. 2, mailed on Mar. 7, 2024, 9 pages (English Translation Provided).
Office Action Received for Japan Application No. 2022-507476, mailed on Mar. 18, 2024, 8 pages. (English translation available).

\* cited by examiner

OPTICAL FIBRE SPLICING METHOD

This application is a national phase of International Application No. PCT/GB2020/051811 filed Jul. 29, 2020, which claims priority to United Kingdom Application No. 1911183.0 filed Aug. 5, 2019, the entire disclosures of which are hereby incorporated by reference.

BACKGROUND OF THE INVENTION

The present invention relates to a method for splicing optical fibres, and an apparatus for use in performing a method for splicing optical fibres.

A number of applications require the joining together of two portions of optical fibre to form a continuous length. The join is known as a splice, and the process of joining is referred to as splicing. A key example is the field of telecommunications, where optical fibres need to be joined in order to produce and maintain sufficient deployable lengths of fibre to carry optical telecommunications signals, and in order to couple a deployed fibre to optical transmitting and receiving equipment at the ends of a telecommunications link. In order to maximise signal transmission, a splice should introduce a minimal amount of optical loss as light passes across the splice from one portion of fibre to another.

Splicing is typically performed by careful alignment of prepared ends of the optical fibres, and softening of the material (typically glass) of the fibre ends before pressing the ends together in order to allow the softened material to fuse together. The majority of commercial splicing systems, especially those used for the installation of optical fibre telecommunications networks, use an electrical arc discharge to heat and soften the fibre ends. For some specialist laboratory or factory-based applications, the heat can instead be provided by a laser beam or a current-carrying metal filament.

Fibre splicing systems were developed to process all-solid optical fibres, in which both the core and the cladding of the fibre are made from a solid material, typically glass. More recently, optical fibres have been developed in which the cladding comprises an array of air holes within the cladding material. This arrangement introduces a periodic variation in the refractive index of the cladding; the portion in which this variation is provided is generally known as a microstructure. Hence, these fibres can be referred to as microstructured fibres. The core of such a fibre can be solid, or may comprise a hollow void filled with air (or another gas), in which case the fibre can be termed a hollow core fibre, or a hollow core microstructured fibre.

The presence of the microstructure and the hollow core makes these fibres vulnerable to damage during splicing. Both the softening of the glass material and the pressing together of the fibres ends can cause deformation and collapse of the holes, leading to disruption of the microstructure and resulting in a lossy splice.

Accordingly, splicing techniques that enable low loss splicing of hollow core optical fibres are of interest.

SUMMARY OF THE INVENTION

Aspects and embodiments are set out in the appended claims.

According to a first aspect of certain embodiments described herein, there is provided a method of forming a splice to join two optical fibres, the method comprising: providing two optical fibres, at least one of which is a hollow core optical fibre; aligning an end of one of the optical fibres with an end of the other optical fibre such that longitudinal axes of the two optical fibres are substantially along a same line and the ends of the optical fibres are spaced apart; performing a prefusion stage comprising: applying an electric arc proximate the ends of the optical fibres in order to soften the material of the ends; moving the ends of the optical fibres together to make contact and then exceed the contact by an overlap distance to form a fused portion in which the ends are fused together; and performing at least one pushing stage, each pushing stage comprising: implementing a cooling period during which no electrical arc is applied; at the end of the cooling period, applying an electrical arc to the fused portion to soften the material of the fused ends; and pushing the fused ends of the optical fibres further together.

According to a second aspect of certain embodiments described herein, there is provided an electric arc fusion splicing apparatus configured to receive ends of two optical fibres and join the two optical fibres by forming a splice using a method according to the first aspect.

According to a third aspect of certain embodiments described herein, there are provided computer-implementable instructions stored on a storage medium, the instructions for control of an electric arc fusion splicing apparatus, which when implemented by a computer processor enable an electric arc fusion splicing apparatus to join two optical fibres by forming a splice using a method according to the first aspect.

According to a fourth aspect of certain embodiments described herein, there is provided a splice joining two optical fibres, at least one of which is a hollow core optical fibre, the splice formed using a method according to the first aspect.

According to a fifth aspect of certain embodiments described herein, there is provided a splice joining two optical fibres, at least one of which is a hollow core optical fibres, the splice having an optical transmission loss less than 0.5 dB and a splice strength greater than 3 N.

According to a sixth aspect of certain embodiments described herein, there is provided a method of forming a splice to join two optical fibres, the method comprising: providing two optical fibres, at least one of which is a hollow core optical fibre; aligning an end of one of the optical fibres with an end of the other optical fibre such that longitudinal axes of the two optical fibres are substantially along a same line and the ends of the optical fibres are spaced apart; performing a prefusion stage comprising: applying one or more beams of laser light proximate the ends of the optical fibres in order to soften the material of the ends; moving the ends of the optical fibres together to make contact and then exceed the contact by an overlap distance to form a fused portion in which the ends are fused together; and performing at least one pushing stage, each pushing stage comprising: implementing a cooling period during which no beam of laser light is applied; at the end of the cooling period, applying one or more beams of laser light to the fused portion to soften the material of the fused ends; and pushing the fused ends of the optical fibres further together.

These and further aspects of certain embodiments are set out in the appended independent and dependent claims. It will be appreciated that features of the dependent claims may be combined with each other and features of the independent claims in combinations other than those explicitly set out in the claims. Furthermore, the approach described herein is not restricted to specific embodiments such as set out below, but includes and contemplates any appropriate combinations of features presented herein. For example, methods and apparatus may be provided in accordance with approaches described herein which include any one or more of the various features described below as appropriate.

BRIEF DESCRIPTION OF THE DRAWINGS

For a better understanding of the invention and to show how the same may be carried into effect reference is now made by way of example to the accompanying drawings in which.

DETAILED DESCRIPTION

Aspects and features of certain examples and embodiments are discussed/described herein. Some aspects and features of certain examples and embodiments may be implemented conventionally and these are not discussed/described in detail in the interests of brevity. It will thus be appreciated that aspects and features of methods and apparatus discussed herein which are not described in detail may be implemented in accordance with any conventional techniques for implementing such aspects and features.

For many years following the invention of optical fibres, all-solid fibres were the norm, in which both a core region and a cladding region of the fibre are defined by one or more solid materials, typically a glass such as silica.

Figure 1:
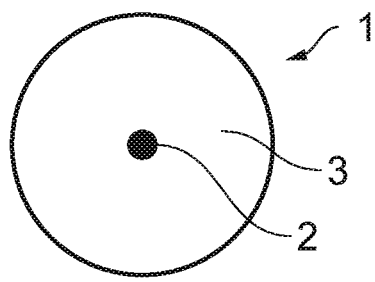
FIG. 1 shows a transverse cross-sectional view of an all-solid optical fibre.

FIG. 1 shows a transverse cross-sectional view of an example all-solid optical fibre, the view being in a plane orthogonal to a length direction of the fibre along which light propagates through the fibre. The fibre 1 comprises a central core region or core 2 of a solid glass material having a first refractive index, surrounded by a cladding region or cladding 3 of a solid glass material have a second refractive index lower than the first refractive index. The core 2 is coaxially disposed within the cladding 3, along a central longitudinal axis of the fibre 1. Light propagating in the fibre 1 is guided along the core 2 by total internal reflection at the boundary between the core 2 and the cladding 3, arising from the refractive index difference.

Figure 2:
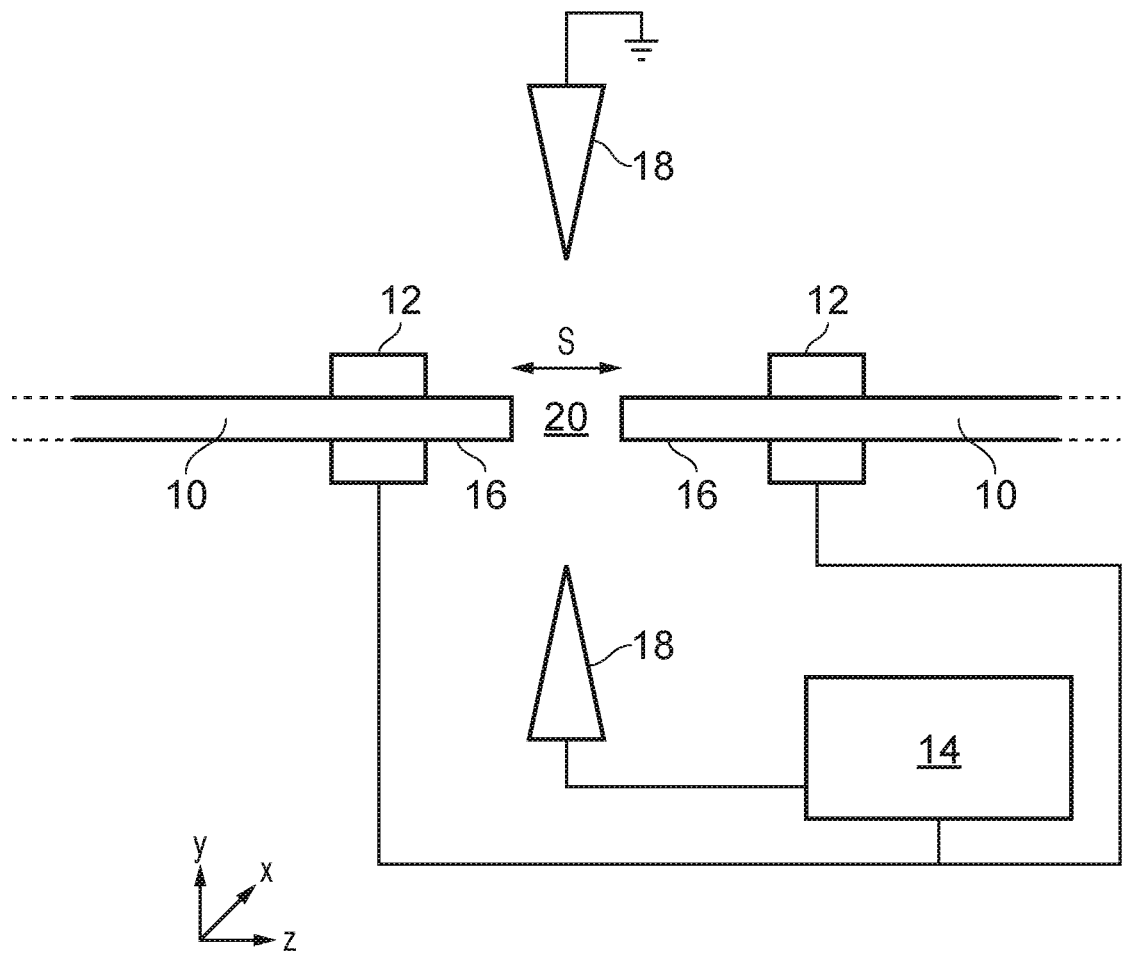
FIG. 2 shows a schematic representation of an electrical arc fusion splicing apparatus suitable for performing a splicing method as disclosed herein.

FIG. 2 shows a simplified schematic representation of an example electric arc fusion splicing apparatus or machine, for forming a splice between two portions of optical fibre in order to join the fibre portions into a continuous length of fibre. Commercially available electric arc fusion splicers include the Fujikura FSM-100M available from Fujikura Europe Limited and the Fitel model S178LDF available from Furukawa Electric Europe Limited. Both these machines are relatively small, and therefore suitable for use in the field, such as for optical fibre telecommunication systems installation. A large variety of alternative machines are also available.

The apparatus in FIG. 2 comprises a pair of clamps 12, into each of which an end part 16 of a portion of optical fibre 10 can be mounted. The clamps 12 are under the control of a controller 14 (which may be implemented as a programmable microprocessor, for example, although arrangements using hardware and firmware in place of or in addition to software are not excluded). The controller 14 is operable to adjust the clamps 12 to move the ends 16 of the fibres 10 relative to one another in three dimensions. Movement in the x-y plane is movement transverse to the length of the fibres 10, and is performed in order to align the fibres 10 so that their physical structures are matched in space, so that when the ends 16 are brought together to form the splice, the core and cladding are aligned and coincident. This is important for a low loss splice so that light can pass from the core of one fibre portion 10 to the core of the other fibre portion 10 without experiencing significant losses at the interface between the two portions 10. Misalignment of the cores can allow light to escape into the cladding and ultimately out of the fibre, leading to an optical transmission loss across the splice. It can also cause back-reflections. Movement in the z-direction is movement of the fibres 10 parallel to their longitudinal axes and is performed to contact the fibre ends 16 together to form the splice. The clamps 12 may further be configured to provide rotation of the fibre end parts 16 about their longitudinal axes (rotation in the x-y plane). This movement can be useful for aligning fibres with an internal structure that lacks circular symmetry, such as polarisation-maintaining fibres.

The apparatus additionally comprises a pair of pointed electrodes 18, which are arranged facing one another across an arc region 20. The electrodes 18 are also connected to and under the control of the controller 14, which activates the electrodes 18 by application of a voltage to cause the flow of an arc current between the electrodes 18, creating a plasma in the arc region. Placement of the ends 16 of the fibres 10 in the arc region 20 while an arc current is generated locates the ends proximate to the arc so that heat can be delivered to the material of the fibre ends 16. This softens the material and allows the ends 16 to fuse together if they are brought into contact.

The controller can be programmed in order to achieve desired spacings and contacts between the fibre ends, and to apply the electrical arc for desired time periods (arc time) with desired current levels (arc current).

Figure 3:
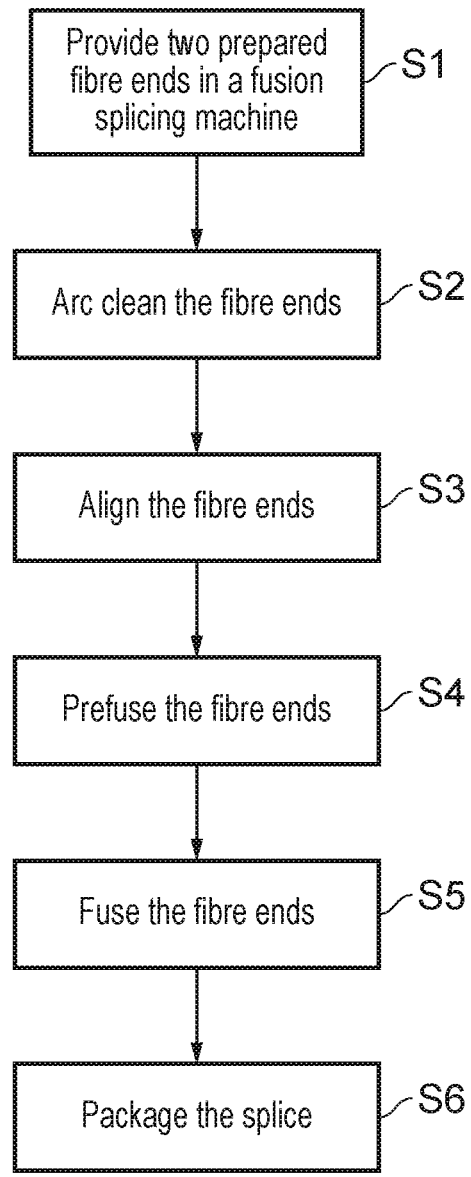
FIG. 3 shows a flow chart of steps in a conventional method for electrical arc fusion splicing of all-solid optical fibres.

FIG. 3 shows a flow chart of steps or stages in an example of a known, conventional method for fusing all-solid optical fibres using an electric arc fusion apparatus. An example of all-solid optical fibre is the widely-used single mode silica fibre SMF-28e® made by Corning®, which has a cladding diameter of 125 μm.

In a first step S1, the ends of two portions of optical fibre which are to be spliced together are prepared, and provided for splicing by being mounted into a fusion splicing machine such as the example in FIG. 2. Preparation typically includes stripping away any external jacket surrounding the fibre cladding, and cleaving the end of the fibre in order to achieve a flat and relatively clean end face or facet for the fibre. The fibres are mounted into the fusion splicing machine with their ends spaced apart by a separation distance or gap s, indicated in FIG. 2.

Once the fibres are mounted, a step S2 is performed, which is a cleaning stage in which the ends of the fibres are cleaned by application of an arc from the electrodes. With the fibre ends or tips in the arc region and separated by a cleaning gap, an arc is struck across the electrodes in order to generate a plasma in the arc region. The plasma decomposes and vaporises any contaminants from the fibre end faces and adjacent side surfaces of the fibre ends. This cleaning stage is carried out because a stronger and more reliably low loss splice can be achieved from clean end facets. For the cleaning stage, the gap s has a chosen value such as 100 μm which allows the end facets to be exposed to the plasma but which does not cause significant softening of the fibre material. To generate the cleansing plasma, the arc may be applied for an arc time of about 150 ms, from an arc current of about 16 mA (suitable for splicing SMF-28e, for example).

The method then proceeds to an alignment stage, step S3, in which the ends of the fibres are moved relative to one another in the x-y plane (linear movement and optionally rotational movement) into positions in which the structural features of the two ends are in good spatial alignment in order to form a smoothly continuous core and cladding structure across the splice. Various techniques are available for achieving alignment. These include core alignment and cladding alignment, in which an image of the adjacent fibre ends is visually inspected, or inspected via image processing, to ensure that either the two cores, or the two claddings (or both) are in good spatial alignment. An alternative is power alignment, in which the fibres ends are brought close together, light is injected into an opposite end of one fibre, and detected at the opposite end of the second fibre after being transmitted across the adjacent ends. The fibre positions are adjusted in order to maximise the transmitted power detected at the end of the second fibre. The choice of any of these alignment techniques does not impact the fusing process.

A next step S4 is a prefusion stage, in which the fibre ends are prefused. After the x-y plane alignment, the fibres ends are positioned in the arc region spaced apart in the z-direction by a selected prefusion gap. A typical prefusion gap size is about 15 μm. An arc is struck from the electrodes for a selected arc time and with a selected arc current, in order to raise the temperature of the fibre material at the fibre ends to the softening point of the material. While the material is in this softened state, the fibre ends are moved or pushed together by operation of the clamps to make contact with one another. After contact, the movement typically continues by a further distance beyond the contact point; this is known as an overlap or overlap distance. Since the material is soft, the ends of the fibres plastically deform as they are overlapped, and the material from the two ends fuses together to create a fused portion of fibre. Pushing into the overlap distance is carried out for a selected time, also, which may be termed a prefusion push time. The arc is maintained during movement of the fibres for the prefusion stage.

Next, a fusion stage is performed, in step S5. In the fusion stage, the positions of the fibres achieved at the end of the prefusion stage, once the overlap has been achieved, are maintained (there is no further movement or pushing), and the arc continues also, typically at a higher arc current. This keeps the ends of the fibres in the softened condition, so that the material of the two ends is able to flow together, thereby improving the physical joining of the fibre ends. The fusion arc will be applied for a selected arc time, typically of the order of 2-3 seconds.

Once an adequate level of fusion is achieved, the spliced fibres can be packaged in a final step S6. The fibre ends are allowed to cool and resolidify, and the spliced fibres are unloaded from the splice machine. Some form of splice protector is placed around the splice in order to protect the exposed and joined fibre material; this is referred to as packaging.

This approach is very successful for all-solid fibres. However, more recently developed fibres have a structure comprising an array or arrangement of holes, capillaries or lumen within the fibre material, extending along the length of the fibre parallel to the longitudinal axis. This structure can be damaged by the splicing method of FIG. 3, leading to lossy splices. The arrangement of holes can be termed a microstructure, so that such fibres can be considered to be microstructured fibres. Typically, the microstructure forms at least part of the cladding of the fibre, in which case the central region of the fibre, surrounded by the cladding microstructure, provides a core as in an all-solid fibre. The core may be solid, or may be a hollow void filled with air or another gas. This latter type of fibre may be termed hollow core microstructured fibre, or more simply, hollow core fibre.

A relevant parameter when considering microstructured fibres, including hollow core fibres, is the air filling fraction. The microstructured part of the fibre, comprising the inner cladding formed with longitudinal holes, is formed from air and glass. The air filling fraction is the ratio of the volume of the air-filled portion(s) of the microstructure to the total volume of the microstructure. Hence, the air filling fraction has a value between 0 and 1. Similarly, it may be defined as the ratio of the corresponding areas in the transverse cross-section through a fibre; the same result is obtained. Also, the air filling fraction may be expressed as a percentage. While early microstructured fibres (which had solid cores) had a large proportion of glass in the microstructure, giving low air filling fractions around 0.1 (10%) or 0.2 (20%), more recently developed fibres, particularly of the hollow core type, have much higher air filling fractions, including air filling fractions of 0.9 (90%) and higher (>90%), so the microstructure is largely air, rather than largely glass. This increase renders these fibre types especially vulnerable to damage during splicing, so that developments in splicing techniques are of significant interest.

As noted above, hollow core optical fibre has a light-guiding core comprising a central void (commonly filled with air, but also alternatively with another gas or mixture of gases, or a vacuum), surrounded by a cladding region comprising a structured arrangement of longitudinal capillaries extending along the fibre length: the microstructure. The propagation of light in air enabled by the absence of a solid glass core reduces the proportion of a guided optical wave which propagates in glass compared to a solid core fibre, offering benefits such as increased propagation speed, reduced loss from both absorption and scattering, and reduced nonlinear interactions. Hence hollow core fibres are very attractive for telecommunications applications; they enable data transmission at nearly the speed of light in vacuum, and at higher optical powers and over broader optical bandwidths, with relative freedom from issues such as nonlinear and thermo-optic effects that can affect light travelling in solid fibres.

Hollow core fibres can be categorised according to their mechanism of optical guidance into two principal classes or types: hollow core photonic bandgap fibre (HCPBF, alternatively referred to as hollow core photonic crystal fibre, HCPCF) [1], and antiresonant hollow core fibre (AR-HCF or ARF) [2]. There are various subcategories of ARFs characterised by their geometric structure, including kagome fibres [3], nested antiresonant nodeless fibres (NANFs) [4] and tubular fibres [5]. The present disclosure is applicable to all types of hollow core fibre, including these two main classes and their associated sub-types plus other hollow core designs. Note that in the art, there is some overlapping use of terminologies for the various classes of fibre. For the purposes of the present disclosure, the terms "hollow core fibre" and "hollow core microstructured fibre" are intended to cover all types of these fibres having a hollow core as described above. The terms "HCPBF" and "HCPCF" are used to refer to hollow core fibres which have a structure that provides waveguiding by photonic bandgap effects (described in more detail below). The terms "ARF" and "antiresonant hollow core fibre" are used to refer to hollow core fibres which have a structure that provides waveguiding by antiresonant effects (also described in more detail below).

Figure 4:
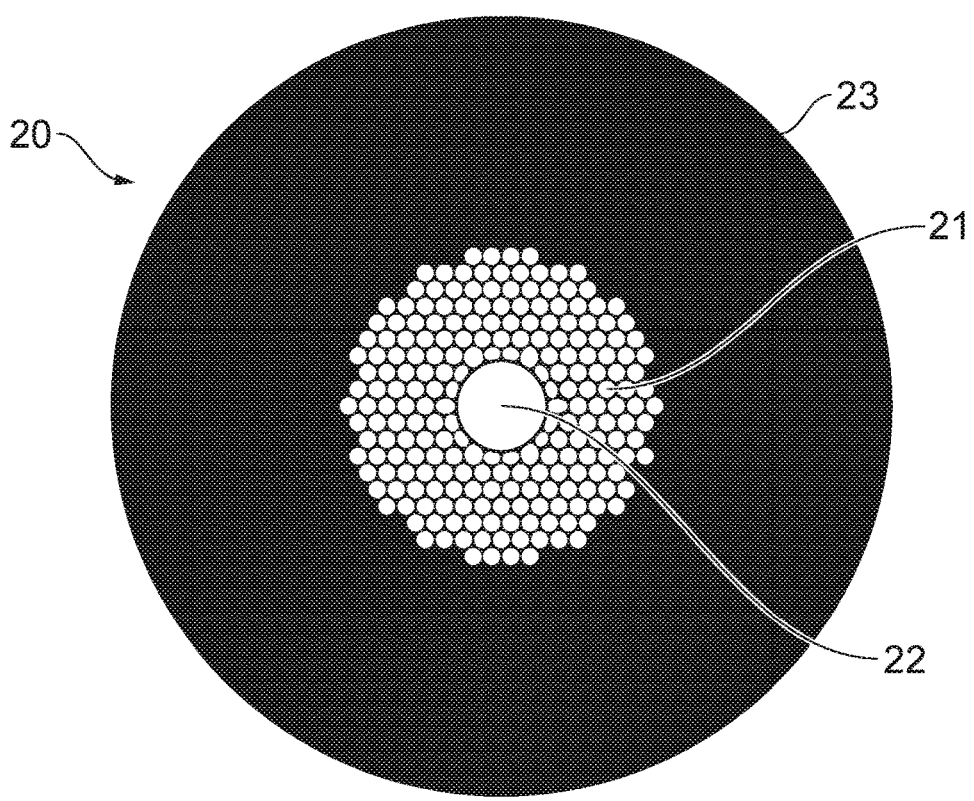
FIG. 4 shows a transverse cross-sectional view of an example of a photonic bandgap hollow core microstructured optical fibre (HCPBF)

FIG. 4 shows a cross-sectional view of an example HCPBF 20. In this fibre type, a structured, inner, cladding 21 comprises a regular closely packed array of many small glass capillaries, from which a central group is excluded to define a substantially circular hollow core 22. The periodicity of the cladding structure provides a substantially periodically structured refractive index and hence a photonic bandgap effect that confines the propagating optical wave towards the core. These fibres can be described in terms of the number of cladding capillaries or "cells" which are excluded to make the core 22. In the FIG. 4 example, the central nineteen cells from the array are absent in the core region, making this a 19-cell core HCPBF. The structured cladding 21 is formed from six rings of cells surrounding the core 22, plus some cells in a seventh ring to improve the circularity of the outer surface of the inner cladding 21. An outer cladding 23 surrounds the structured cladding 21. The air filling fraction of this example fibre is greater than 90%.

In contrast to HCPBF, antiresonant hollow core fibres guide light by an antiresonant optical guidance effect. The structured cladding of ARFs has a simpler configuration, comprising a much lower number of larger glass capillaries or tubes than a HCPBF to give a structure lacking a high degree of periodicity so that photonic bandgap effects are not significant, but with some periodicity on a larger scale since the tubes are evenly spaced. The structure means that antiresonance is provided for propagating wavelengths which are not resonant with a wall thickness of the cladding capillaries, in other words, for wavelengths in an antiresonance window which is defined by the cladding capillary wall thickness. The cladding capillaries surround a central void or cavity which provides the hollow core of the fibre, and which is able to support antiresonantly-guided optical modes. The structured cladding can also support cladding modes able to propagate primarily inside the capillaries, in the glass of the capillary walls or in the spaces or interstices between the cladding capillaries and the fibre's outer cladding. The loss of these additional non-core guided modes is generally very much higher than that of the core guided modes. The fundamental core guided mode typically has by far the lowest loss amongst the core guided modes. The antiresonance provided by a capillary wall thickness which is in antiresonance with the wavelength of the propagating light acts to inhibit coupling between the fundamental core mode and any cladding modes, so that light is confined to the core and can propagate at very low loss.

Figure 5:
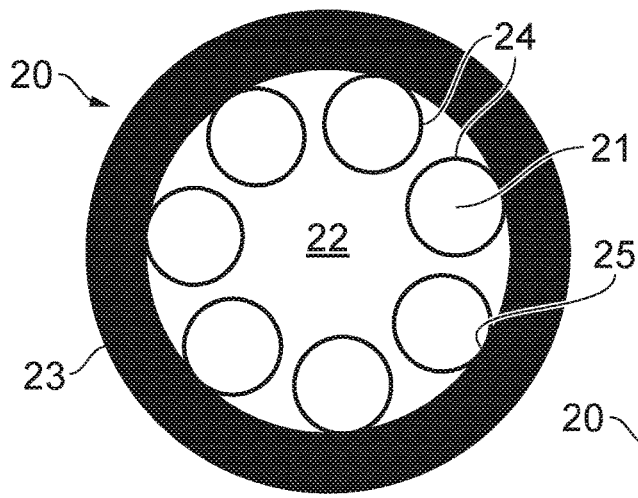
FIG. 5 shows a transverse cross-sectional view of a first example antiresonant hollow core microstructured optical fibre.

FIG. 5 shows a transverse cross-sectional view of an example simple antiresonant hollow core fibre. The fibre 20 has an outer tubular cladding 23. The structured, inner, cladding 21 comprises a plurality of tubular cladding capillaries 24, in this example seven capillaries of the same cross-sectional size and shape, which are arranged inside the outer cladding 23 in a ring, so that the longitudinal axes of each cladding capillary 24 and of the outer cladding 23 are substantially parallel. Each cladding capillary 24 is in contact with (bonded to) the inner surface of the outer cladding 23 at a location 25, such that the cladding capillaries 24 are evenly spaced around the inner circumference of the outer cladding 23, and are also spaced apart from each other so there is no contact between neighbouring capillaries. In some designs of ARF, the cladding tubes 24 may be positioned in contact with each other (in other words, not spaced apart as in FIG. 5), but spacing to eliminate this contact can improve the fibre's optical performance. The spacing removes nodes that arise at the contact points between adjacent tubes and which tend to cause undesirable resonances that result in high losses. Accordingly, fibres with spaced-apart cladding capillaries may be referred to as "nodeless antiresonant hollow core fibres".

The arrangement of the cladding capillaries 24 in a ring around the inside of the tubular outer cladding 23 creates a central space, cavity or void within the fibre 20, also with its longitudinal axis parallel to those of the outer cladding 23 and the capillaries 24, which is the fibre's hollow core 22. The core 22 is bounded by the inwardly facing parts of the outer surfaces of the cladding capillaries 24. This is the core boundary, and the material (glass or polymer, for example) of the capillary walls that make up this boundary provides the required antiresonance optical guidance effect or mechanism. The capillaries 24 have a thickness at the core boundary which defines the wavelength for which antiresonant optical guiding occurs in the ARF. The air filling fraction of this example fibre is in excess of 90%.

Figure 6:
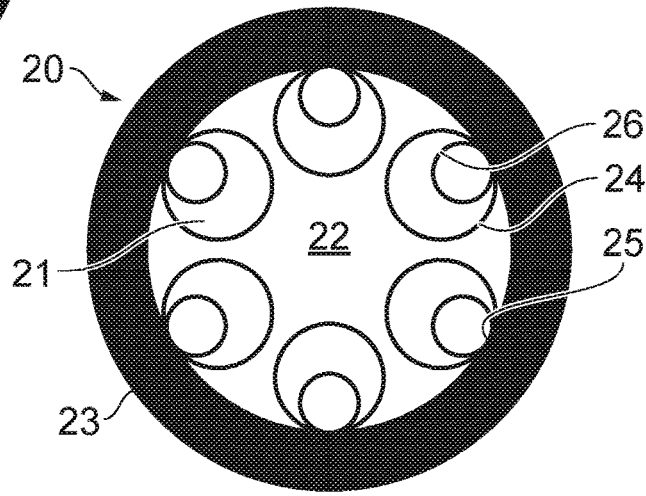
FIG. 6 shows a transverse cross-section view of a second example antiresonant hollow core microstructured optical fibre.

FIG. 6 shows a transverse cross-sectional view of a second example ARF. The ARF 20 has a structured inner cladding 21 comprising six cladding capillaries 24 evenly spaced apart around the inner surface of a tubular outer cladding 23 and surrounding a hollow core 22. Each cladding capillary 24 has a secondary, smaller capillary 26 nested inside it, bonded to the inner surface of the cladding capillary 24, in this example at the same azimuthal location 25 as the point of bonding between the primary capillary 24 and the outer cladding 23. These additional smaller capillaries 26 can reduce the optical loss. Additional still smaller tertiary capillaries may be nested inside the secondary capillaries 26. ARF designs of this type, with secondary and optionally smaller further capillaries, may be referred to as "nested antiresonant nodeless fibres", or NANFs. In other NANF designs, one or more additional capillaries may be nested at azimuthal locations which are different from the point of bonding between the primary capillary and the outer cladding. A pair of additional capillaries may be equally or unequally displaced from the point of bonding, for example.

Many other capillary configurations for the structured cladding of an ARF are possible, and the disclosure is not limited to the examples described above. For example, the capillaries need not be of circular cross-section, and/or may or may not be all of the same size and/or shape. The number of capillaries surrounding the core may be for example, four, five, six, seven, eight, nine, ten or more.

Herein, terms including hollow core optical fibre, hollow core fibre, hollow core waveguide, hollow core optical waveguide, hollow core microstructured fibre, hollow core microstructured waveguide, and similar terms are intended to cover optical waveguiding structures configured according to any of the above examples and similar structures, where light is guided by any of several guidance mechanisms (photonic bandgap guiding, antiresonance guiding, and/or inhibited coupling guiding) in a hollow elongate void or core surrounded by a structured (microstructured) cladding comprising a plurality of longitudinal capillaries. These various terms may be used interchangeably in the present disclosure.

Conventional fusion splicing approaches such as that described with regard to FIG. 3 tend to cause damage to the internal structure of hollow core fibres, resulting in very lossy splices compared to those achievable for all-solid fibres. This is particularly relevant for high air filling fraction fibres, since the more delicate microstructure is easier to perturb during the splicing process, and the resulting perturbations have a more significant effect on the optical propagation capabilities of the fibre. The problem is exacerbated by the presence of a hollow core. The known splicing processes tend to cause a distortion or collapse of the holes in the microstructure, and/or of the core void, when the fibre ends are heated. The collapse can influence loss in two ways: firstly, the light guiding structure is destroyed, and secondly, a mode mismatch occurs across the splice if the collapse is different in the two fibre portions.

Early attempts to address this issue were only modestly successful. A first reported effort spliced a solid-core microstructured fibre with an air-filling fraction of about 0.2 to a conventional all-solid dispersion-shifted fibre to obtain a loss of roughly 1.5 dB at a propagating light wavelength of 1.55 µm [6]. Subsequent work spliced a solid core microstructured fibre with an air-filling fraction of 0.12 to itself and obtained a range of losses from about 0.08 dB to about 3 dB, where the spread was attributed to the collapse of some or all of the holes [7].

More recent work has related to hollow core microstructured fibres with higher air filling fractions, spliced to themselves [8] and to all-solid fibres [9]. Splices between the hollow cores fibres had a low transmission loss of 0.16 dB, and were able to withstand a force of 2 N applied over a time period of 200 ms or longer in proof testing. The strength of a fibre splice is highly relevant for joining fibres deployed in a telecommunications link. However, the results were produced using specialist laboratory equipment unsuitable for the installation of optical fibre networks in the field.

Accordingly, there is a requirement for a fibre splicing method for joining hollow core microstructured fibres by low loss, high strength splices, which can be conveniently utilised in the field. The present disclosure presents techniques which can achieve strong splices able to withstand forces in the region of 3-4 N and above, with low losses of 0.5 dB and below. This loss level is acceptable for application of the technique to telecommunication systems, and the strength capability indicates that the approach is suitable for use in the field, such as at a data centre. Splicing of hollow core fibres according to the present disclosure enables hollow core fibres to be joined to themselves (or to all-solid fibres) by low loss splices using a simple and portable technique. For telecommunication systems, this provides increased lengths of fibre links, the ability to repair breaks in already-deployed fibres, and ease of splicing outside a laboratory and in the field. Also, splice losses are components of the overall power budget for a fibre link, so low loss splicing enhances the maximum achievable link length.

Figure 7:
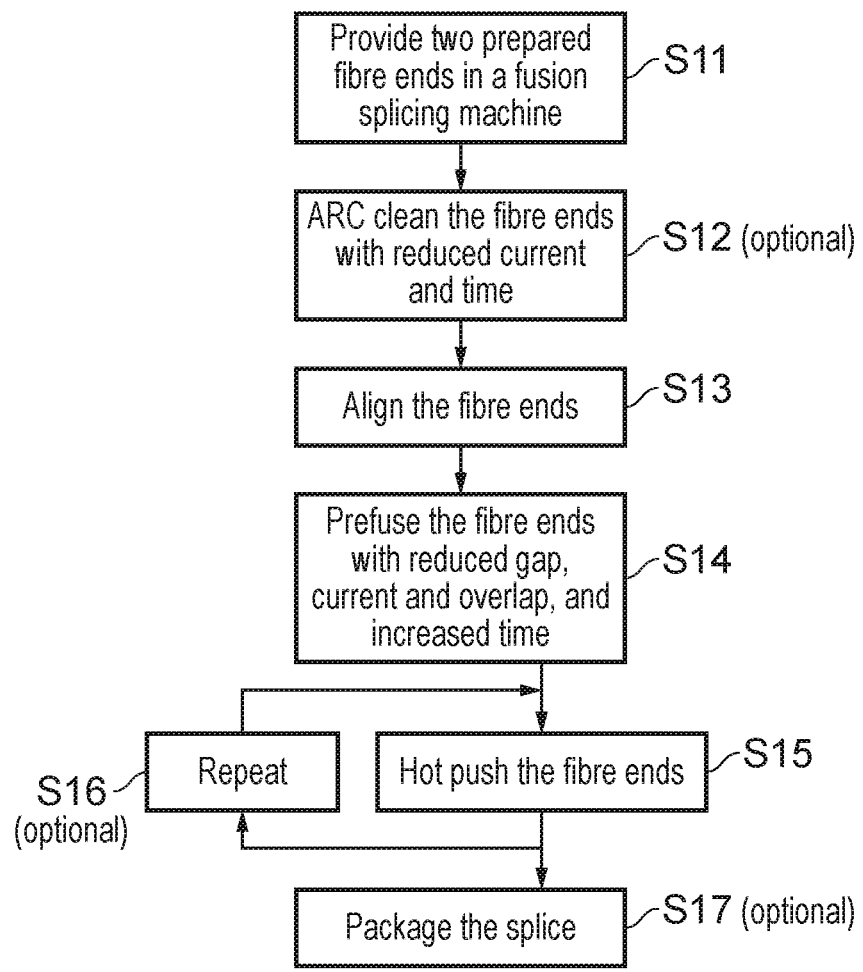
FIG. 7 shows a flow chart of steps in an example method for electrical arc fusion splicing of hollow core microstructured optical fibres as disclosed herein.

FIG. 7 shows a flow chart of steps in an example method according to an embodiment. As with the conventional method described with respect to FIG. 3, the method can be performed using an electric arc fusion splicing machine, such as the commercially available models mentioned above. Other electric arc fusion splicing machines may be used instead, however, including other commercially available models, or custom-built machines. The invention is not limited in this regard.

In a first step S11, the ends of the fibres to be spliced are prepared and placed into an electric arc fusion splicing machine (or similar arrangement that allows the various steps to be performed). At least one of the fibres is a hollow core microstructured fibre. Both fibres may be hollow core microstructured fibres. In this case, the two fibres may be different types or configurations of hollow core microstructured fibre (for example any of the types described above, although other designs of hollow core microstructured fibre are not excluded), or may be the same type or configuration of hollow core microstructured fibre. In other alternatives, one fibre may be a hollow core microstructured fibre and the other fibre may be an all-solid fibre or a solid core microstructured fibre. The fibres are made of one or more glass materials, such as silica.

The ends of the fibres may be prepared in the conventional manner, for example by stripping away any outer coating or jacket layers in order to expose the underlying glass material, and cleaving the ends to achieve neat end facets. Alternative or additional preparation processes may also be carried out. The nature of the preparation is outside the scope of the appended claims and preparation may be omitted altogether, although careful and appropriate preparation can enhance the quality of the splice, particularly in terms of strength. After preparation the two fibre ends are introduced into the splicing machine, for example by mounting each end into a fibre clamp such as the pair of facing clamps 12 in FIG. 2.

The method may then proceed to an optional step S12, comprising a cleaning stage. For the cleaning stage, the fibre ends are positioned in the arc region between the electrodes of the fusion machine, spaced apart in the z-direction by a cleaning gap or distance, and an electric arc is struck between the electrodes in order to generate a plasma to remove some or all of any contaminants present on the fibre end facets and/or the adjacent outer sides of the fibre ends. In order to reduce damage to the fibre microstructure that can be caused during arc cleaning in the conventional manner, the arc is applied for a reduced time period. In conventional arc cleaning of all-solid fibres, the arc time is typically about 150 ms. In the present arc cleaning step, the arc time is greatly reduced, for example to about 25 ms, or a time in the range of 22 ms to 28 ms, or in the range of 20 ms to 30 ms, or in the range of 10 ms to 40 ms. This reduction in the arc time reduces the amount of energy from the arc to which the microstructure is exposed, so that less damage is caused by softening of the material leading to hole distortion or collapse. Additionally or alternatively, the energy reaching the microstructure can be reduced by reducing the current at which the arc is struck from the electrodes (the arc current). Usefully, an arc current of about 11 mA or 11.2 mA can be used, or in the range of 11 mA to 12 mA, or in the range of 10 mA to 12 mA, or in the range of 9 mA to 13 mA, or in the range of 8 mA to 14 mA. A value of 11.2 mA corresponds to about 70% of the level of arc current typically used for arc cleaning of all-solid fibres, being about 16 mA. Hence, the arc current is reduced by about 30% from the all-solid fibre arc current.

Note that the cleaning stage may alternatively be omitted, or may be performed in accordance with conventional arc plasma cleaning for all-solid fibres rather than according to the modified parameters just described.

The method then proceeds to step S13, in which the fibre ends are aligned. This may be as described for step S3 in FIG. 3, and may be by power alignment or cladding alignment. Core alignment is not currently an available option for hollow core microstructured fibres because suitable image processing software has not yet been developed. However, this is a likely future possibility so core alignment is included within the scope of the disclosure as an option for the alignment stage of step S13. Rotational adjustment may be implemented to align the features of the microstructure. Once the fibre ends are aligned appropriately in the x-y plane (with the longitudinal axes of the two fibres lying along the same line), they are set in a spaced-apart configuration with a spacing or gap in the z-direction in the arc region of the splicing machine, ready for the next step.

This next step, S14, is a prefusion stage. This can be carried out largely as described with regard to the prefusion stage of step S4 of FIG. 3, but with one or more modified parameters. Overall, therefore, an arc is applied to the arc region of the splicing machine in which the spaced apart fibre ends are located, in order to soften the material of the fibre ends. The ends are then moved together, towards one another, to firstly contact and then overlap so that the softened material can fuse together. This creates a fused portion or region joining the two fibres together; this is the splice.

Four parameters are relevant to the prefusion stage, and any or all of them may be modified as compared to typical values for these parameters used in the fusion splicing of all-solid fibres. Firstly, the gap between the fibre ends may be reduced. This limits the ability of the plasma generated by the arc to reach the microstructure (which is positioned radially inwardly from the fibre ends' outer surfaces and therefore protected somewhat by the outer cladding—see FIGS. 4, 5 and 6), so that softening of the material defining the microstructure is reduced or avoided. The shape of the microstructure is thereby better maintained. In conventional prefusion of all-solid fibres, a gap size of about 15 µm is typically employed. Here, it is proposed that the prefusion gap is reduced to about 5 µm, or to be in the range of about 3 µm-7 µm, or in the range of about 2 µm-10 µm. Practically, a lower limit may be placed on the prefusion gap owing to the minimum cleave angles which can be obtained on the fibre ends.

Secondly, the size of the prefusion arc current is reduced compared to that typically used for all-solid fibre splicing. The arc current may be reduced by about 18% from typical arc currents used for 125 µm diameter all-solid fibres, being about 14.9 mA. So the arc current may be about 12.2 mA, or in the range of 12 mA to 13 mA, or in the range of 11 mA to 14 mA. A reduction in the current delivered provides less heating to the fibre ends, so the temperature increase at the ends is less, giving a reduced amount of softening of the fibre material at the ends. This makes the material less susceptible to deformation when the fibre ends are brought together.

Thirdly, and also to reduce deformation of the microstructure, the overlap distance can be reduced compared to typical overlaps used when prefusing all-solid fibres. Recall that the overlap is the amount of movement of the two fibre ends towards one another (so that one fibre is moved in the +z direction and the other fibre is moved in the −z direction) beyond the position at which the end facets come into contact. A typical overlap for all-solid fibres is about 10 µm. It is proposed that the overlap be reduced to about 8 µm or less, for example in the range of 7 µm-8 µm or in the range 6 µm to 8 µm.

In order to achieve adequate fusing of the material of the two ends when they are moved into contact in the prefusion stage given that the material is less softened than in known methods owing to the reduced arc current, it is fourthly proposed that the time for which the fibre ends are moved or pushed together to achieve the overlap be increased. The prefusion arc is applied during this prefusion push time. A prefusion push time of at least 400 ms is proposed, for example a time in the range of 400 ms-500 ms, or 400 ms-600 ms, or 400 ms-700 ms, or 400 ms-800 ms, or 600 ms-800 ms. Times in excess of 800 ms are not excluded, however and may be used if appropriate.

In conventional arc fusion splicing of all-solid fibres, the fusion stage (step S5 in FIG. 3) is the longest and highest temperature stage. If applied to hollow core microstructured fibres, a fusion stage can cause significant disruption of the microstructure, leading to a lossy splice. According to the method of the present disclosure, it is proposed that the conventional fusion stage be omitted when splicing hollow core fibres.

The strength of a splice, defined by the amount of applied force the splice can withstand for a given time period, is derived at least in part by the overlap. As noted above, in the modified prefusion stage a smaller overlap is proposed, which may lead to a reduced splice strength. In order to compensate for this, the new method replaces the omitted fusion stage with a newly devised pushing stage, in which the overlap is increased during a process which limits the amount of heating, and resultant softening, experienced by the fibre material so that damage to the microstructure is limited.

Accordingly, following the prefusion stage of step S14, the method proceeds to a pushing stage S15, in which a first "hot push" is carried out. Initially, the fibre ends are allowed to cool, during a cooling period in which no electric arc is applied in the arc region. This allows heat generated in the prefusion stage to dissipate from the fused portion of the fibres so that the microstructure can stabilise. The cooling period may have a duration of about 200 ms, for example. Once the fibres have cooled sufficiently, typically to a level substantially below the softening point, an arc is struck between the electrodes to reheat the fused fibre ends in the arc region. An arc current of about 12.5 mA may be used, for example. The arc provides heating and some softening particularly to the outer parts of the fibre ends. Once the heat had been delivered, and the fibre material of the fused portion is softened again, the fibre ends are moved or pushed closer together. In other words, they are moved in opposite directions along the z-direction. The additional push distance may be about 25% of the overlap distance previously achieved in the prefusion stage S14. Recalling that the overlap may be about 8 µm, such as between 6 µm and 8 µm, the additional push distance in a hot push may be in the range of about 1 µm to 5 µm.

The arc may be turned off before the pushing is implemented, or alternatively, the arc can be maintained during the pushing. An arc time for the pushing stage can be 200 ms or longer, for example up to about 800 ms, or somewhat longer if required. Hence, the arc time can be in the range of 200 ms-800 ms, or 300 ms-800 ms, or 400 ms-800 ms, or 500 ms-800 ms, or 600 ms-800 ms, or 700 ms-800 ms, or 750 ms-850 ms, or 700 ms-900 ms. If the pushing is carried out while the arc is being applied, it can be carried out during a final part of the arc time, for example for the final 200 ms of the arc time, or for the final 150 ms, or for the final 175 ms, or for the final 225 ms, or for the final 250 ms. Other durations are not excluded however.

Optionally, the pushing stage may be repeated, in which case the method proceeds to step S16. The method may comprise, for example, a number of hot pushes, or pushing stages, in the range of one to ten pushing stages. A particularly useful number has been found to be three, four or five pushing stages. This number can give an adequately strong splice. In some cases, one or two pushing stages might achieve a splice of a desired strength, while in other cases, more than five pushing stages might be appropriate. The number of pushing stages might depend on the diameter of the optical fibres and hence the amount of glass material which has to be fused, for example, and also on the use to which the spliced length of fibre will be put, where different applications can demand different levels of robustness from a fibre splice.

Each pushing stage moves the fibre ends further beyond the contact point, and therefore increases the overlap. The total overlap after the final hot push is therefore the sum of the prefusion overlap distance and all the hot push distances. As an example, a prefusion overlap of 8 µm and three hot pushes each applying a push distance of 2 µm will produce a final overlap distance of 14 µm. For a conventional all-solid fibre fusion splice, the overlap may be about 10 µm, so the proposed fusion splice method can result in a final overlap which is greater than typical overlap distances for splices between all-solid fibres. This can help to improve the splice strength.

Once the desired number of hot pushes has been carried out, the method moves to an optional final step S17, in which the splice is packaged in order to protect it. Any packaging technique can be used. Alternatively, the splice may remain unpackaged, or be further processed in some other manner.

Overall, the present disclosure proposes various modifications and adaptations of known arc fusion splicing in order to produce a method suitable for creating low loss high strength splices between optical fibres when at least one of the fibres is a hollow core fibre. The differences proposed for the various stages of conventional fusion splicing of two all-solid fibres can be summarised as:

Cleaning stage: some or all of
　reduced arc time
　reduced arc current
Prefusion stage: some or all of
　reduced gap between fibre ends
　reduced arc current
　reduced overlap distance
　longer push time
Fusion stage
　omitted
Pushing stage (hot push)
　additional stage, comprising at least one and up to about ten "hot pushes".

As noted above, the cleaning stage may be carried out in an unmodified form, an alternative form, or not at all. The modifications to the prefusion stage, and the replacement of the fusion stage with the hot push(es) are considered to be more significant in terms of helping to maintain the integrity of the fibre microstructure. In some cases, it may be found that sufficient effect can be derived merely from one of these changes, so that a modified prefusion stage is followed by a conventional (or other) fusion stage, or a conventional (or other) prefusion stage is followed by one or more hot pushes.

Various splices fabricated using methods in line with the example method of FIG. 7 have been tested to demonstrate the ability of the methods to form splices with low loss and high strength.

Figure 8:
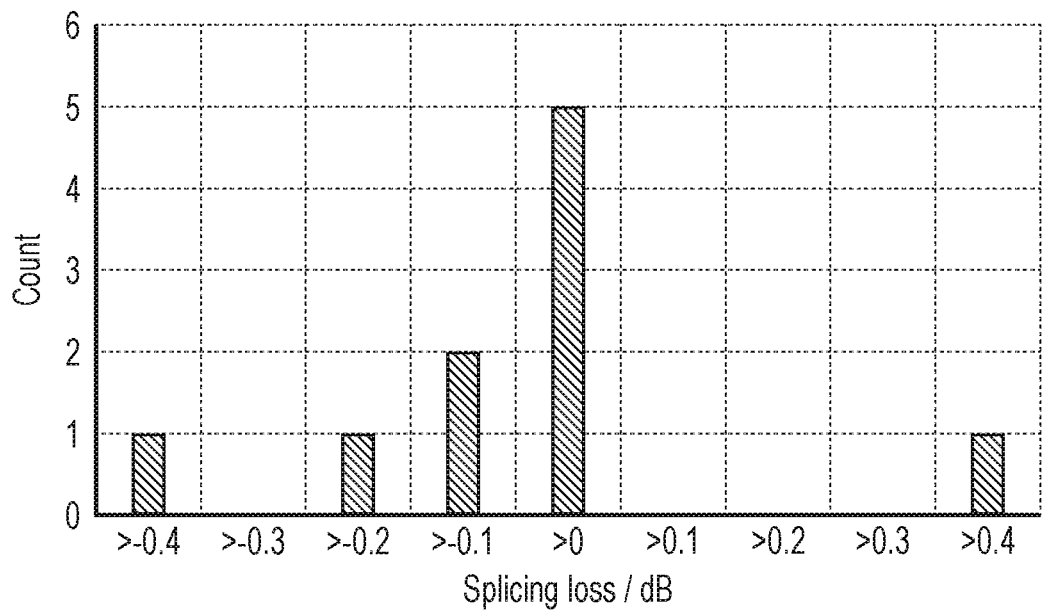
FIG. 8 shows a histogram of measured splicing loss for a number of hollow core fibre splices formed according to a method as disclosed herein, using a first type of electrical arc fusion apparatus.

FIG. 8 shows a histogram of results of measuring the losses of ten splices made between two lengths of hollow core fibre using the proposed method implemented on a Fujikura FSM-100M splicing machine (Fujikura Europe Limited). The hollow core fibre had a cladding diameter of 235 µm, a microstructure diameter of 90 µm, a core diameter of 30 µm and an air filling fraction of approximately 93%. The loss is indicated as a splicing loss, in decibels (dB), measured at a wavelength of 1550 nm. By this is meant specifically the loss introduced by the prefusion stage and the hot pushes. This measure eliminates contributions to loss from effects, largely geometrical, such as variation in the cleave angle of the fibre end facets, which are not pertinent to the proposed method. Splicing loss is measured by comparing the power transmitted from one fibre to the other after the alignment stage with the transmitted power after the pushing stage. After alignment, the fibre ends were spaced apart by a 5 µm gap; since this is much less than the Rayleigh length, the effect on the measured splicing loss of closing the gap by making the splice is negligible.

As can be seen, a range of splicing losses greater than −0.4 dB and less than 0.5 dB was achieved, with the largest number of splices having a loss between 0 dB and 0.1 dB. This is an attractively low level of loss, and represents a significant improvement over known splicing methods. Had a conventional arc fusion splicing method been used to join the hollow core fibres, the splicing losses would have been several dB.

Figure 9:
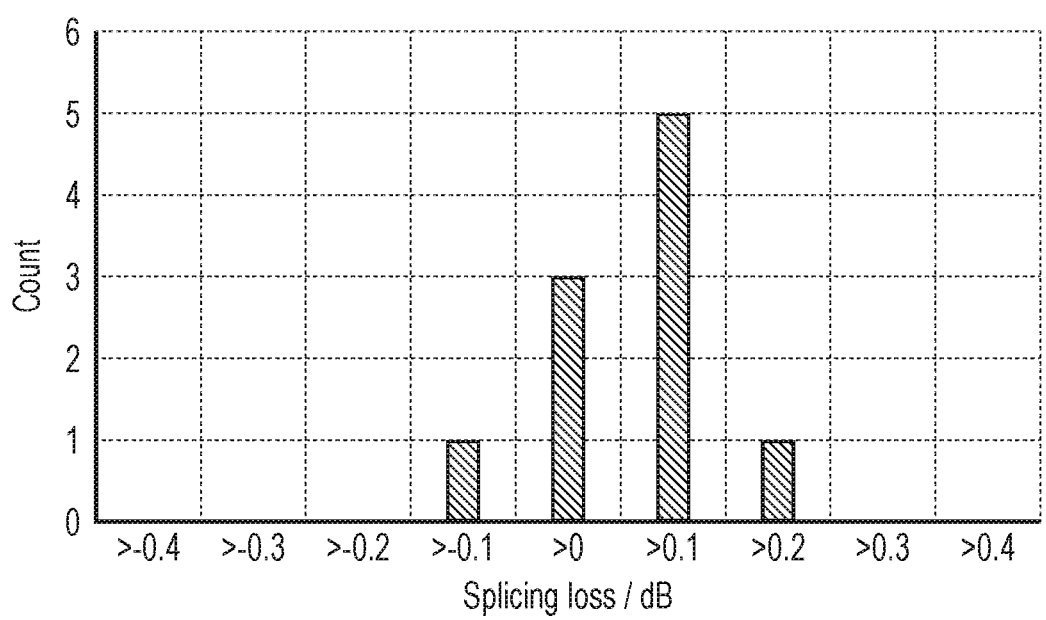
FIG. 9 shows a histogram of measured splicing loss for a number of hollow core fibre splices formed according to a method as disclosed herein, using a second type of electrical arc fusion apparatus.

FIG. 9 shows a histogram of results of measuring the losses of a further ten splices, this time made using a Fitel model S178LDF splicing machine (Furukawa Electric Europe Limited), but otherwise with the same fibres and conditions as the splices made for the FIG. 8 data. Again, very low splicing losses were achieved, in a range between −0.1 dB and 0.3 dB.

Figure 10:
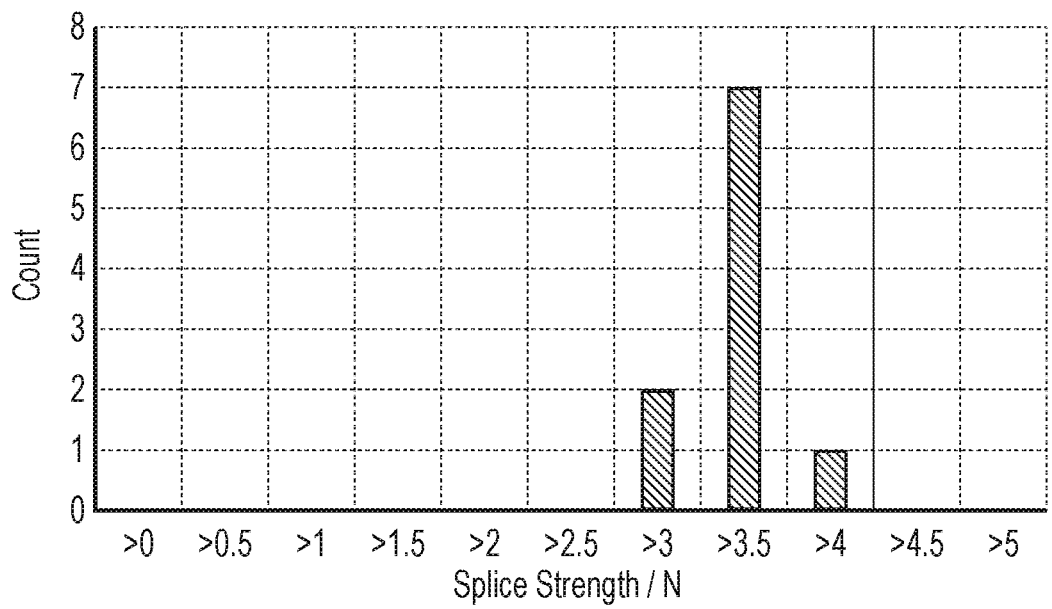
FIG. 10 shows a histogram of measured splice strength for the same hollow core fibre splices as in FIG. 8.

FIG. 10 shows a histogram of measured splice strength of the splices for which splicing loss is shown in FIG. 8. The strength was measured by attaching one of the portions of optical fibre in a splice to a Mecmesin BFG force gauge and applying an increasing force to the other, spliced-on, portion of optical fibre until the splice broke. The force at failure, measured by the force gauge, is designated as the splice strength. As can be seen, the splices were found to have a relatively high strength, in a range from more than 3 N to less than 4.5 N.

Figure 11:
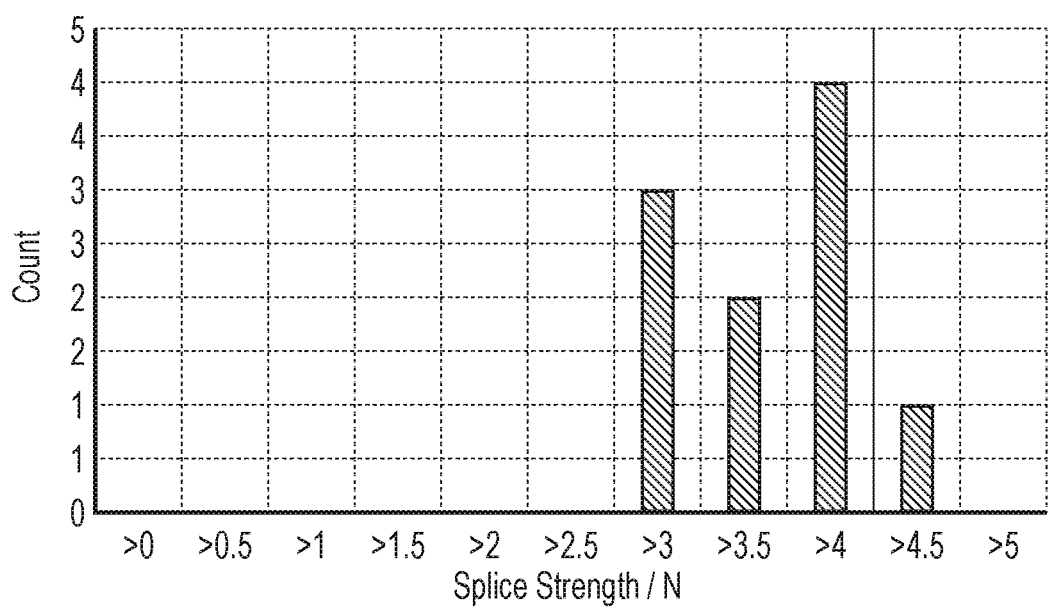
FIG. 11 shows a histogram of measured splice strength for the same hollow core fibre splices as in FIG. 9.

FIG. 11 shows a histogram of the corresponding data for the splices for which splicing loss is shown in FIG. 9. Similar splice strengths were found, in this case in a range from more than 3 N to less than 5 N.

These levels of splice strength are considered to be more than adequate for withstanding the demands placed on optical fibre splices in a telecommunications system environment.

The SMF-28e all-solid fibre noted above, and for which suitable electric arc fusion parameters are well-established, has a cladding diameter of 125 µm. In contrast, the results in FIGS. 8-11 relate to hollow core microstructured fibres with a larger diameter of 235 µm. This larger size is quite typical for hollow core fibres, which may have diameters generally in excess of 200 µm. If one were to deliver the same amount of energy from a fusion arc to the larger hollow core fibre and the smaller all-solid fibre, a smaller increase in temperature will be produced in the hollow core fibre. The correspondingly lessened degree of fibre material softening would likely be considered inadequate for forming a robust splice in the hollow core fibre type. Accordingly, it is a surprising result that the methods proposed herein are able to successfully splice hollow core fibres by using lower arc currents than conventionally, since this will further reduce the amount of heating achieved in the fibre material.

The various splice parameters such as arc current, arc time, overlap size and pushing distance can be adjusted in order to achieve quality splicing in different types and sizes of hollow core microstructured fibres, and also to achieve quality splicing in microstructured fibres fabricated from materials with different concentrations of one or more dopants for the purpose of tailoring properties of the materials. The example parameters given herein are particularly appropriate for hollow core microstructured fibres having diameters in the range of 220 µm to 250 µm, but may be successfully used with little or no adjustment on larger or smaller fibres. The methods can be used on hollow core fibres with any level of air filling fraction (for example 0.1 and above), but usefully are applicable to the increasingly delicate microstructures currently being produced which have air filling fractions of 0.9 and above, or 0.8 and above, or 0.7 and above.

Fusion splicing is known to be affected by a variety of circumstances and parameters, including environmental conditions, electrode wear and fibre geometry. For example, as the skilled person will appreciate, over time electrodes in a splice machine tend to degrade and perform less well. Atmospheric conditions including temperature, humidity and pressure also vary with time and affect the plasma generation. Accordingly, the various arc current values given herein are typical only, and may require some adjustment in a real-world situation. Such adjustment and modification should be understood to fall within the scope of the claimed invention.

The optical fibres may be made from any of the glass-based materials known for the fabrication of hollow core fibres, in particular silica. Types of glass include "silicate glasses" or "silica-based glasses", based on the chemical compound silica (silicon dioxide, or quartz), of which there are many examples. Other glasses suitable for optical fibres include, but are not limited to, doped silica glasses. The materials may include one or more dopants for the purpose of tailoring the optical properties of a fibre, such as modifying absorption or transmission, or tailoring properties of the materials for purposes such as facilitating fibre manufacture, improving reliability, or enabling or enhancing a particular end use.

The disclosure also relates to apparatus for splicing hollow core fibres. Electric arc fusion splicing of hollow core fibres according to the proposed methods can be carried out using custom-made electric arc fusion splicing machines or apparatus, which are configured to perform splicing using the stages and parameters described herein. Usefully, the apparatus can be adjusted in order to reset the parameters for splicing of different fibre types. This can be readily achieved by implementing the apparatus to comprise a programmable controller or control unit or processor which generates control signals for the various components of the apparatus (fibre clamps and electrodes). A user interface can be provided to allow a user to alter various settings pertaining to the operation of these components, so that parameters such as arc time, arc current, fibre end gap, overlap distance, and hot push distance, time and number can be altered as required.

Alternatively, it is possible to modify or set the parameters of existing (including commercially available) arc fusion splicing machines in order that they are operable to make splices following the proposed methods. Where such machines include a programmable controller operating under software control, it is possible to provide software which when executed by a processor in the controller enables the machine to operate in accordance with the proposed methods. The software can replace, update, or supplement existing control software stored in memory of the machine. Accordingly, the disclosure also relates to computer-implementable instructions suitable for execution on a computer processor that can control an electric arc fusion splicing machine to form hollow core fibre splices as described herein.

While the present disclosure has thus far been concerned with fusion splicing of hollow core optical fibres by electric arc fusion techniques, it is also possible to perform fusion splicing by using a laser beam applied to the vicinity of the fibre ends to heat and soften the fibre material, in place of an electrical arc. Conventional approaches for fusing all-solid fibres are the same or similar for both laser fusion and arc fusion. Accordingly, the modifications to arc fusion methods proposed herein are also considered to be applicable to laser fusion methods. Hence, a method which is also within the scope of the disclosure comprises a method of forming a splice to join two optical fibres, the method comprising: providing two optical fibres, at least one of which is a hollow core optical fibre; aligning an end of one of the optical fibres with an end of the other optical fibre such that longitudinal axes of the two optical fibres are substantially along a same line and the ends of the optical fibres are spaced apart; performing a prefusion stage comprising: applying one or more beams of laser light proximate the ends of the optical fibres in order to soften the material of the ends; moving the ends of the optical fibres together to make contact and then exceed the contact by an overlap distance to form a fused portion in which the ends are fused together; and performing at least one pushing stage, each pushing stage comprising: implementing a cooling period during which no beam of laser light is applied; at the end of the cooling period, applying one or more beams of laser light to the fused portion to soften the material of the fused ends; and pushing the fused ends of the optical fibres further together.

The various embodiments described herein are presented only to assist in understanding and teaching the claimed features. These embodiments are provided as a representative sample of embodiments only, and are not exhaustive and/or exclusive. It is to be understood that advantages, embodiments, examples, functions, features, structures, and/or other aspects described herein are not to be considered limitations on the scope of the invention as defined by the claims or limitations on equivalents to the claims, and that other embodiments may be utilised and modifications may be made without departing from the scope of the claimed invention. Various embodiments of the invention may suitably comprise, consist of, or consist essentially of, appropriate combinations of the disclosed elements, components, features, parts, steps, means, etc., other than those specifically described herein. In addition, this disclosure may include other inventions not presently claimed, but which may be claimed in the future.

REFERENCES

[1] U.S. Pat. No. 9,904,008
[2] WO 2015/185761
[3] J Broeng et al, "Analysis of air-guiding photonic bandgap fibers", Optics Letters vol. 25(2), 96-98, 2000
[4] Francesco Poletti, "Nested antiresonant nodeless hollow core fiber," Opt. Express, vol. 22, 23807-23828, 2014
[5] JR Hayes et al, "Antiresonant hollow core fiber with an octave spanning bandwidth for short haul data communications", Journal of Lightwave Technology vol. 35(3), 437-442, 2017
[6] P. J. Bennett, T. M. Monro, and D. J. Richardson, "Toward practical holey fiber technology: Fabrication, splicing, modelling, and characterization," Opt. Lett., vol. 24(17), 1203-1205, 1999
[7] B. Bourliaguet, C. Paré, F. Émond, A. Croteau, A. Proulx, and R. Vallée, "Microstructured fiber splicing," Opt. Express, vol. 11(25), 3412-3417, 2003
[8] J Wooler et al, "Robust low loss splicing of hollow core microstructured photonic bandgap fiber to itself", Proc. Opt. Fiber Commun. Conf., 2013
[9] J Wooler et al, "Overcoming the challenges of splicing dissimilar diameter solid-core and hollow-core photonic band gap fibers", Workshop on Speciality Optical Fibers and their Applications, Optical Society of America, 2013

The invention claimed is:

1. A method of forming a splice to join two optical fibres, the method comprising:
providing two optical fibres, at least one of which is a hollow core optical fibre;
aligning an end of one of the optical fibres with an end of the other optical fibre such that longitudinal axes of the two optical fibres are substantially along a same line and the ends of the optical fibres are spaced apart;
performing a prefusion stage comprising:
applying an electric arc proximate the ends of the optical fibres in order to soften the material of the ends;
moving the ends of the optical fibres together to make contact and then exceed the contact by an overlap distance to form a fused portion in which the ends are fused together; and
performing at least one pushing stage, each pushing stage comprising:
implementing a cooling period during which no electrical arc is applied;
at the end of the cooling period, applying an electrical arc to the fused portion to soften the material of the fused ends; and
pushing the fused ends of the optical fibres further together.

2. A method according to claim 1, in which the at least one pushing stage comprises up to ten pushing stages.

3. A method according to claim 2, in which the at least one pushing stage comprises three, four or five pushing stages.

4. A method according to claim 1, in which the at least one pushing stage comprises pushing the fused ends of the optical fibres further together while the electric arc is being applied.

5. A method according to claim 4, in which the pushing is performed during a final part of an arc time for which the electric arc is applied in the at least one pushing stage.

6. A method according to claim 5, in which the arc time is 200 ms or longer, and the pushing is performed during a final part of the arc time in the range of 150 ms to 250 ms.

7. A method according to claim 1, in which, in the at least one pushing stage, the fused ends of the optical fibres are pushed further together by a distance which is between 20% and 30% of the overlap distance in the prefusion stage.

8. A method according to claim 1, in which, in the aligning, the ends of the optical fibres are spaced apart by a gap in the range of about 2 µm to 10 82 m prior to performing the prefusion stage.

9. A method according to claim 1, in which during the prefusion stage, the overlap distance is in the range of 6 µm to 8 µm.

10. A method according to claim 1, in which, during the prefusion stage, the electric arc is generated using an electrical current in the range of 11 mA to 14 mA.

11. A method according to claim 1, the method further comprising:
performing a cleaning stage prior to the aligning, the cleaning stage comprising:
positioning the optical fibres with the ends of the optical fibres spaced apart; and
applying an electric arc proximate the ends of the optical fibres in order to generate a plasma in a space between the fibre ends which removes contaminants from end surfaces of the optical fibres; in which the electric arc is applied for a cleaning arc time in the range of 20 ms to 30 ms.

12. A method according to claim 11, in which the electric arc is generated using an electrical current in the range of 8 mA to 14 mA.

13. A method according to claim 1, in which the hollow core optical fibre comprises a hollow core surrounded by a microstructured cladding in which the fraction of air filling is at least 0.9.

14. A method according to claim 1, in which the hollow core optical fibre comprises an antiresonant hollow core fibre.

15. A method according to claim 1, in which the hollow core optical fibre comprises a photonic bandgap hollow core fibre.

16. A method according to claim 1, in which both of the two optical fibres is a hollow core fibre.

17. A method according to claim 1, in which one of the optical fibres is a all-solid optical fibre.

18. An electric arc fusion splicing apparatus configured to receive ends of two optical fibres and join the two optical fibres by forming a splice using a method according to claim 1.

19. A method of forming a splice to join two optical fibres, the method comprising:
providing two optical fibres, at least one of which is a hollow core optical fibre;
aligning an end of one of the optical fibres with an end of the other optical fibre such that longitudinal axes of the two optical fibres are substantially along a same line and the ends of the optical fibres are spaced apart;
performing a prefusion stage comprising:

applying one or more beams of laser light proximate the ends of the optical fibres in order to soften the material of the ends;

moving the ends of the optical fibres together to make contact and then exceed the contact by an overlap distance to form a fused portion in which the ends are fused together; and performing at least one pushing stage, each pushing stage comprising:

implementing a cooling period during which no beam of laser light is applied;

at the end of the cooling period, applying one or more beams of laser light to the fused portion to soften the material of the fused ends; and pushing the fused ends of the optical fibres further together.

20. A method according to claim 1, in which the at least one pushing stage comprises pushing the fused ends of the optical fibres further together while the electric arc is being applied.

* * * * *